(12) United States Patent
Gross

(10) Patent No.: US 7,445,555 B2
(45) Date of Patent: Nov. 4, 2008

(54) AXIAL INSULATION FOR A UNIVERSAL JOINT

(75) Inventor: Norbert Gross, Duesseldorf (DE)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

(21) Appl. No.: 11/276,047

(22) Filed: Feb. 10, 2006

(65) Prior Publication Data

US 2006/0183560 A1 Aug. 17, 2006

(30) Foreign Application Priority Data

Feb. 11, 2005 (EP) .................................. 05100987

(51) Int. Cl.
*F16D 3/40* (2006.01)
(52) U.S. Cl. ........................................ 464/87; 464/136
(58) Field of Classification Search .................... 464/87, 464/92, 98, 132, 136; 280/775
See application file for complete search history.

(56) References Cited

U.S. PATENT DOCUMENTS

| 1,180,468 | A |   | 4/1916  | Bartlett          |         |
|-----------|---|---|---------|-------------------|---------|
| 1,456,068 | A |   | 5/1923  | Lord              |         |
| 1,694,064 | A |   | 12/1928 | Jencick           |         |
| 1,702,363 | A |   | 2/1929  | Peters            |         |
| 2,024,777 | A |   | 12/1935 | Neumann           |         |
| 3,342,041 | A |   | 9/1967  | Nebiker           |         |
| 4,121,437 | A |   | 10/1978 | Michel            |         |
| 4,229,951 | A |   | 10/1980 | Jedlicka          |         |
| 4,412,827 | A |   | 11/1983 | Petrzelka et al.  |         |
| 4,850,933 | A |   | 7/1989  | Osborn            |         |
| 5,267,904 | A | * | 12/1993 | Geisthoff         | 464/136 |
| 5,551,919 | A |   | 9/1996  | Cherpician        |         |
| 6,685,569 | B2|   | 2/2004  | Kurzeja et al.    |         |
| 6,893,350 | B2| * | 5/2005  | Menosky et al.    | 464/87  |
| 6,923,726 | B1|   | 8/2005  | Lindenthal et al. |         |
| 2004/0152526 | A1 | * | 8/2004 | Sekine          | 464/132 |
| 2004/0224778 | A1 |   | 11/2004 | Menosky et al. |         |

FOREIGN PATENT DOCUMENTS

| DE | 10001270    | 7/2001  |
| EP | 0160599     | 11/1985 |
| EP | 0563940 A2  | 10/1993 |
| EP | 0967411     | 12/1999 |
| FR | 2138424     | 1/1973  |
| FR | 2568329     | 1/1986  |
| GB | 851174      | 10/1960 |
| GB | 942495      | 9/1963  |
| WO | 01/51823    | 7/2001  |

OTHER PUBLICATIONS

Abstract for WO 01/51823 (Above).
Abstract for DE 10001270 (Above).

* cited by examiner

*Primary Examiner*—Greg Binda
(74) *Attorney, Agent, or Firm*—O'Brien Jones, PLLC

(57) ABSTRACT

A universal joint couples a drive shaft and a driven shaft and comprises two joint yokes, each joint yoke having bearing elements at axially opposite yoke arms. The two joint yokes are arranged radially at an angle of 90° in relation to each other to form an internal space. The universal joint also comprises fastening elements having an L-shaped cross section and pivotable in the axially opposite yoke arms of one of the joint yokes, a pin bearer pivotable in the other joint yoke, and an elastic coupling element connecting the fastening elements and the pin bearer.

9 Claims, 3 Drawing Sheets

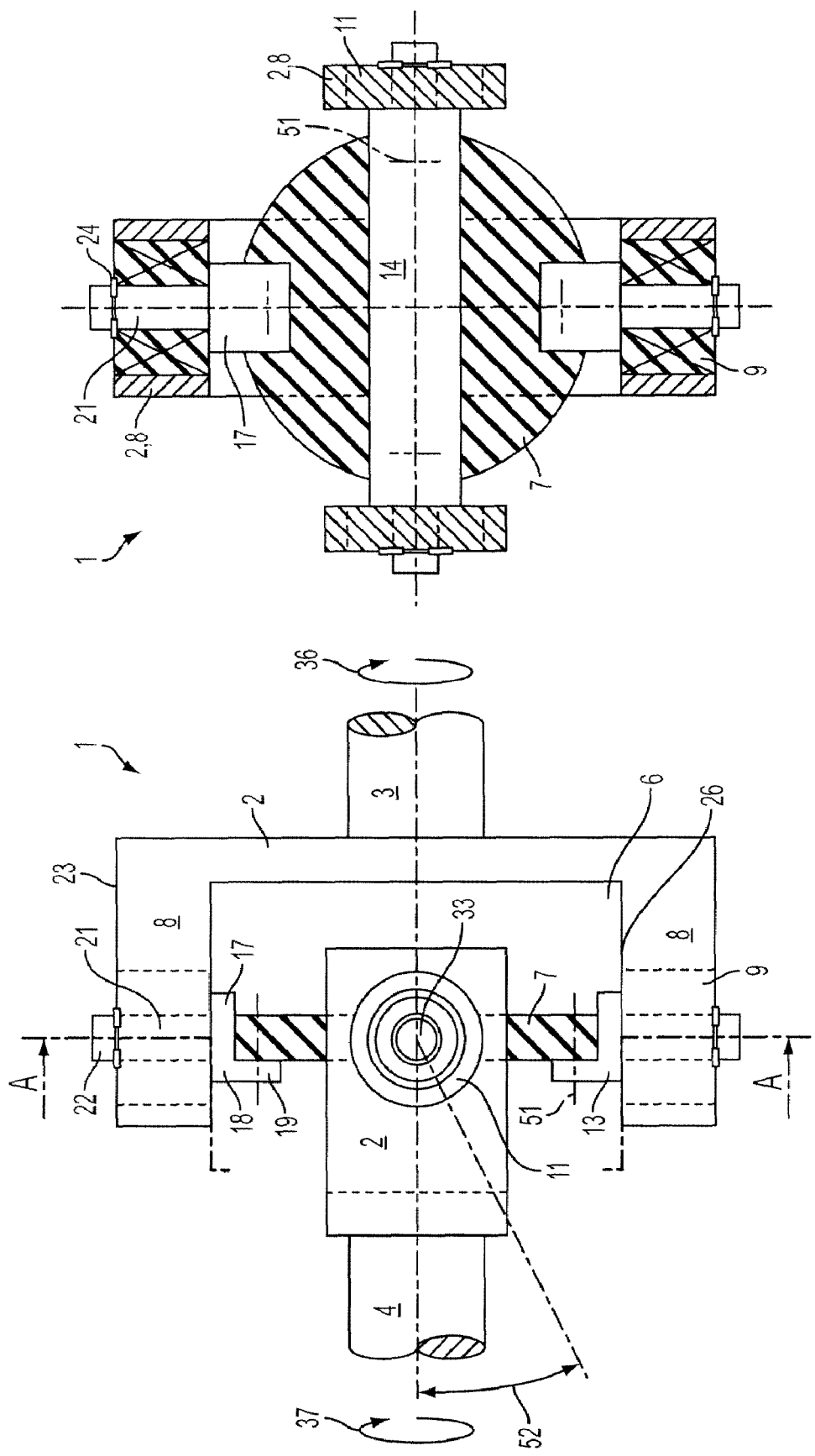

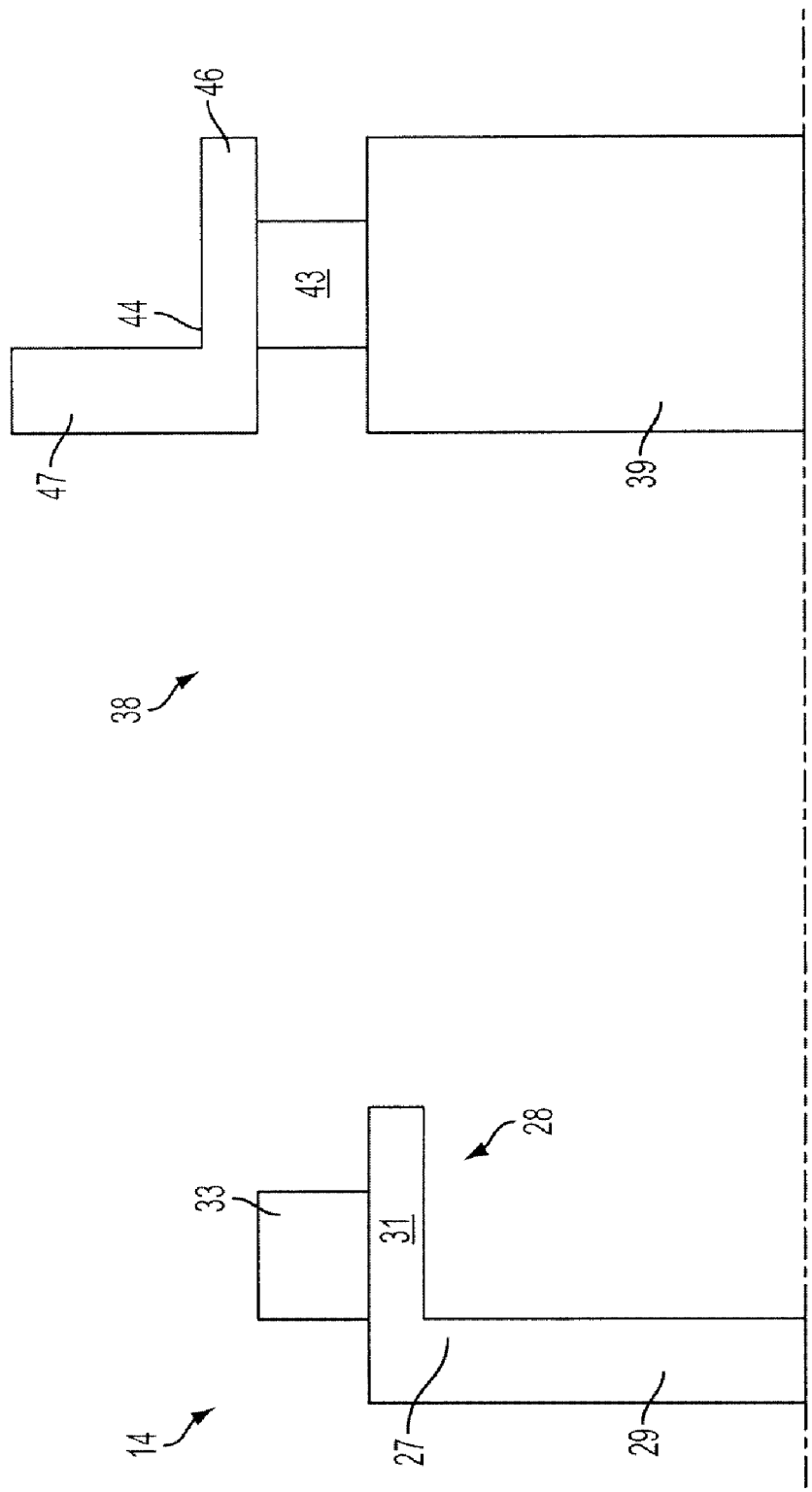

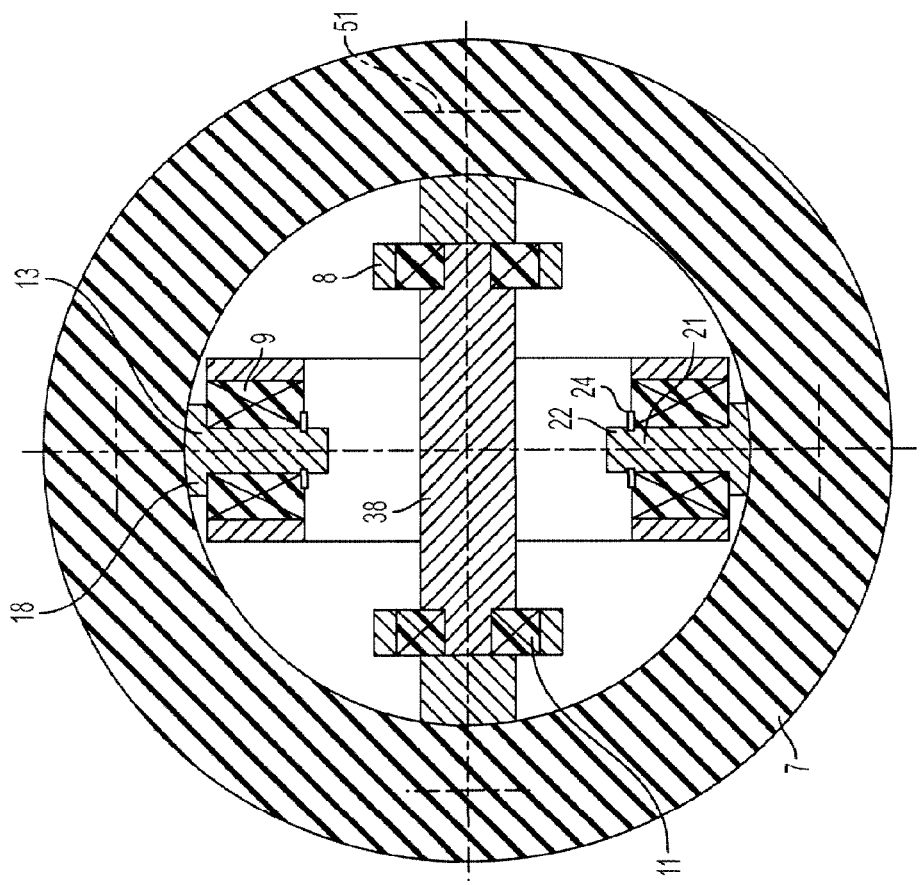
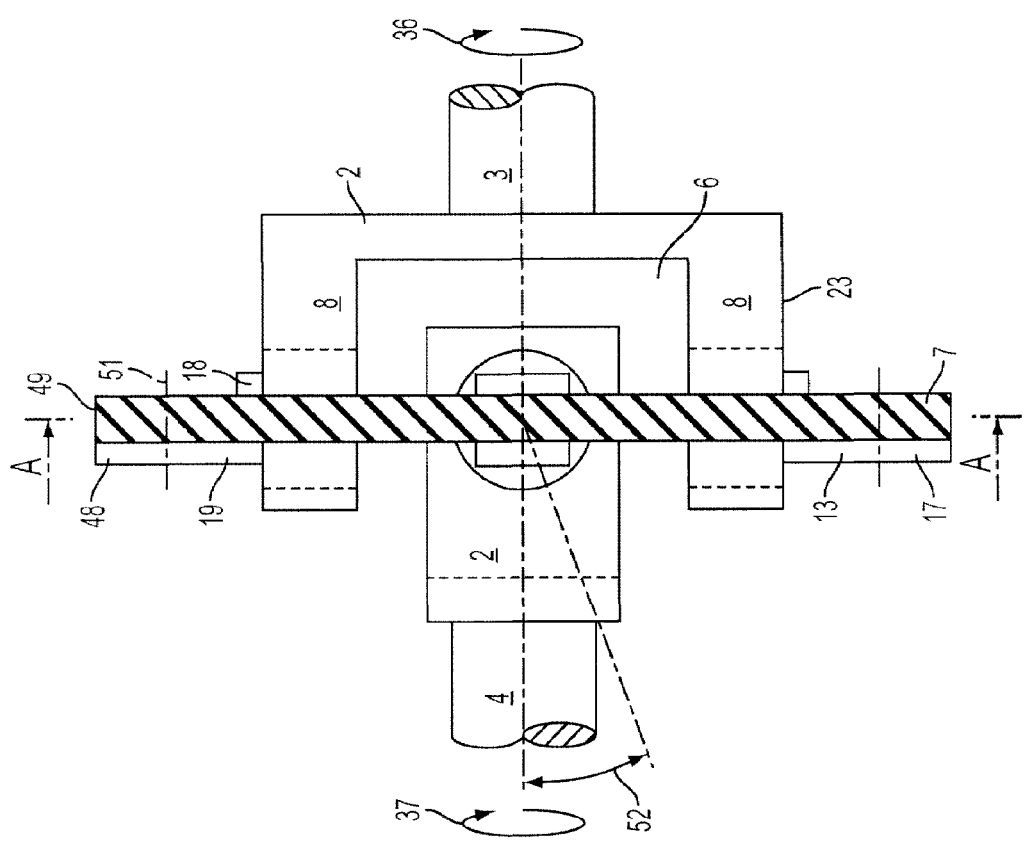
FIG. 4
FIG. 5

AXIAL INSULATION FOR A UNIVERSAL JOINT

The present invention is related to U.S. patent application Ser. No. 11/276,049 entitled "Axial Insulation for a Universal Cross Joint", U.S. patent application Ser. No. 11/276,051 entitled "Insulation for Universal Cross Joint", U.S. patent application Ser. No. 11/276,052 entitled "A Universal Cross Joint With Axial Insulation", and U.S. patent application Ser. No. 11/276,053 entitled "A Cardanic Cross Joint With Insulation", filed simultaneously herewith.

FIELD OF THE INVENTION

The invention relates to a cardan joint having two joint yokes, wherein one of the joint yokes is connectable or connected with a driven shaft or a drive shaft, and the other joint yoke is connectable or connected to a shaft to be driven or a drive shaft, and wherein the two joint yokes are arranged twisted radially at an angle of 90° in relation to each other so that the two joint yokes form an internal space, and wherein an elastic coupling element is associated with the cardan joint.

BACKGROUND OF THE INVENTION

Cardan joints or universal joints, are usually used when two torque-transmitting shafts whose aligned orientation is not always ensured are to be connected with each other. The cardan joint then usually consists of two opposing joint yokes that are arranged twisted radially at an angle of 90° in relation to each other that each represents one end of the two shafts that are to be connected in an articulated manner. The cross member, which consists of two pin bearers offset against each other by 90°, is disposed between the joint yokes, the cross member being made of one piece so that the two pin bearers are rigidly connected with each other. The pin bearers are each supported, pivotally about their axes, in the two joint yokes.

With regard to the transmission of driving forces, the skilled person is regularly presented with the task of transmitting the rotational movement on the one hand, but, on the other, of eliminating vibrations and shocks if possible. Such interferences may, for example, be caused by vibrations from the drive unit. This problem is especially noticeable in automobile engineering, in particular in the area of the drive train, for example in the area of the cardan shaft where the vibrations between drive assembly and rear axle are transmitted without hindrance, and in the area of the steering line or in the steering column where, should conventional cardan joints be used, no insulation whatsoever is effected against low-frequency vibrations or shocks imposed by road bumps. Such interferences may, on the one hand, lead to damages in the drive train or the steering column and/or to adverse effects of an acoustic or mechanical nature for the driver.

For the purpose of uncoupling with regard to acoustics or vibration dynamics, in particular in the steering column, it is, for example, known to use a torsional elastic coupling with a so-called Hardy disk as an axially elastic coupling element or a loop disk. The Hardy disk is disposed, for example, in the steering column between the bottom cardan joint and a steering housing or steering gear or between the cardan joints. The Hardy disk, which is rigid in the direction of rotation, is formed such that it is soft in the direction of the steering column. As principle requires, the bending stiffness of the Hardy disk is relatively small. This causes a distortion of the Hardy disk with the bending moments from the cardan joint if the Hardy disk is arranged in series with the cardan joint, as is commonly the case. Since a Hardy disk alone (without a cardan joint), at least given appropriate life expectancies, is not suitable for connecting non-aligned shafts, the number of components is disadvantageously increased with the necessary arrangement in series with the cardan joint. Furthermore, the axial constructional space is increased thereby, and the usual compensation of the discontinuities by means of two cardanic joints arranged in anti-phase is disturbed by the additional Hardy disk since it works like an additional joint when placed in series.

The following is a discussion of relevant art pertaining to universal joints. The discussion is provided only for understanding of the invention that follows. The summary is not an admission that any of the work described below is prior art to the claimed invention.

EP 0 563 940 B1 discloses a universal joint comprising two forks which are situated opposite one another with a 90° offset and which are each a part of each one of two shafts which are to be pivotally interconnected, or which are adapted each to be connected to each one of two shaft ends which are to be pivotally interconnected, and comprising two journal pairs which are offset by 90° from another and which form a journal cross and which are rotatable about their axis in the respective fork ends and, relative to the rotational axis of the shafts, are mounted for torque transmission, the two journal pairs being at least slightly pivotable relatively to one another in the plane formed by the journal cross, each journal being mounted in an anchor bracket and adjacent anchor brackets are interconnected by an elastic coupling element, whereby the elastic coupling element contains reinforcing inlays in loop form, which are disposed to be stationary and which each interconnect two adjacent anchor brackets and in that the reinforcing inlays in loop form are situated along the periphery of the universal joint in a loop plane which is perpendicular to the plane of the journal cross.

It must be regarded as a main disadvantage of the cross joint disclosed in EP 0 563 940 B1 that the two pairs of pins connect the own pins with each other integrally in different ways: The one pair uses a through bolt, the other pair is configured from two short pins that are connected with each other by means of an additional connecting portion. For this reason, a different production tool is required for the production of each pin or pair of pins, which makes the production of the cross joint extremely cost-intensive. The necessary connecting portion furthermore limits the axial and radial clearance of the joint. Furthermore, the need for axial constructional space can be optimized.

It is a further disadvantage that the cross joint disclosed in EP 0 563 940 B1 takes a lot of constructional effort and is thus very susceptible to malfunction. It must be considered a further disadvantage that the yokes must be designed small with regard to width and that thus, their yoke bearings must be designed to be bigger (more expensive) in order to transmit a sufficient torque given reasonable construction dimensions. If the flexible ring is damaged in the cross joint of EP 0 563 940 B1, a replacement ring must be supplied via the anchors. In addition, the cross joint is difficult to balance, especially in the case of shafts that rotate quickly.

EP 0 160 599 describes a flexible coupling device comprising first and second yokes which are intended to be fixed, respectively, to a drive member and a driven member, which each have arms arranged so that the arms of the first yoke are interposed with those of the second yoke, whereby to each yoke is fixed a support and these two supports are arranged opposite each other so that the facing surfaces of these supports are substantially perpendicular to the rotation axis of the device, in that an elastomeric linking element is fixed to these facing surfaces of the supports, and in that each support is fixed to the corresponding yoke by means of a spindle engaging in at least one opening in said support and in holes provided in the arms of said yoke.

GB 942,495 discloses a universal coupling for shafts comprising a flexible disc having coupling elements extending one on each side thereof, each for connection to one of the shafts to be coupled, the coupling elements being pivoted to the disc about axes at right angles and lying normally to the axis of the disc whereby, in use of the coupling, angular misalignment of the coupled shafts may be accommodated by pivoting of the coupling elements without flexure of the disc, the disc being composed wholly or mainly of plastic, rubber or the like resilient material which is unrestrained so as to be free to flex during use of the coupling.

It must be considered as a main disadvantage of the connection for shafts disclosed in GB 942,495 that the coupling elements are rotated with clearance towards the disk and with significant friction, the torsion clearance and the friction merely satisfying modest demands.

Therefore, what is needed is an improved universal joint of the type mentioned at the beginning with simple means in such a way that it is cheaper to produce from an economic standpoint, without the elastic coupling element having to convey significant bending moments.

SUMMARY OF THE INVENTION

In accordance with the present invention, a universal joint is provided for coupling a drive shaft and a driven shaft. The universal joint comprises two joint yokes, each yoke having bearing elements at axially opposite yoke arms. One joint yoke is connected with the driven shaft and the other joint yoke is connected to the drive shaft. The two joint yokes are arranged radially at an angle of 90° in relation to each other to form an internal space. The universal joint also includes one fastening element, respectively, pivoted in one of the joint yoke axially opposite yoke arms. The universal joint further includes a pin bearer pivoted in the other joint yoke, and an elastic coupling element. The fastening element and the pin bearer are connected to each other via the elastic coupling element.

Advantageously, a hitherto commonly used elastic uncoupling member arranged in series (additional elastic coupling) can thus be done without in the cardan joint according to the invention. The elastic coupling element is advantageously arranged parallel to the cardan joint. Within the sense of the invention, a parallel arrangement means that the elastic coupling element is directly associated with the cardan joint. The cardan joint according to the invention has half a cross member, namely only a single pin bearer, as well as the holding element for receiving the elastic coupling element. Thus, the cardan joint as a unit with the elastic coupling element integrated into the joint is easier and cheaper to produce. In addition, a cardan joint is provided which satisfies high demands with regard to torsion clearance and to the bearing friction.

The bearing elements associated with the fastening elements are capable of accepting a bending moment for the cantilevered support of the fastening elements in addition to the radial and axial forces, wherein the bearing elements should have an appropriate overall length, seen in radial direction. It is possible, in particular because of an identical design of the two fastening elements, to reduce both the costs for storage and/or provision as well as for production, since a production of the respective identical fastening elements is possible by means of a single production tool. Thus, the identical components need not be stored separately anymore, as is quite appropriate in the case of different components.

It is favorable within the sense of the invention, if the bearing elements associated with the fastening elements are preferably formed such that they are able to accept a bending moment. Therefore, the bearing elements associated with the fastening elements are preferably formed as double-row anti-friction bearings, for example as double-row ball bearings; however, the bearing elements may also be formed as broad plain bearings, for example to accept bending moments in addition to the axial and radial forces. In contrast, the bearing elements associated with the pin bearer may be formed as single-row bearings in order to accept radial forces in addition to the axial forces. The bearing elements associated with the pin bearers may be formed as anti-friction bearings, for example as needle bearings or ball bearings, or may of course be formed as plain bearing. The bearings are fixed in a suitable manner, radially relative to an axis of the joint, in the joint yokes or their yoke arms. Possible embodiments are, for example, press fit, bonding or positive fit (abutting at the shoulder, spring ring or the like) of the outer races of the bearing in the joint yokes or their joint arms.

It is expediently provided that the fastening elements are formed as pivot bolts or anchor pins. The fastening elements, seen in cross section, have an L-shaped area having a transversal web and a base web that is directed away radially from and arranged perpendicularly to the transversal web, the L-shaped area merging into a pin which on one side protrudes over the respective yoke arm. Thus, the fastening element reaches through the bearing elements in the respective joint yokes or the respective yoke arms in which the bearing elements are placed. The pin may, for example, be secured with a securing element, for example, a shaft securing ring, which is why a corresponding groove may be incorporated in the pin.

It is favorable within the sense of the invention, if the one pin bearer is formed, at least in certain areas, corresponding to the fastening element, it being expediently provided that the pin bearer has a base web corresponding to the base web of the fastening element.

In a preferable embodiment of the invention, the fastening element, with its L-shaped area, is disposed in the internal space, which is why it may advantageously be provided to dispose the elastic coupling element in the internal space as well. In this case it is expedient if the elastic coupling element is formed as a torsion-resistant, flexural elastic or axially elastic disk, for example, a Hardy disk. However, the elastic coupling element may also of course be formed as a torsion-resistant, flexural elastic or axially elastic ring, or annulus, or multi-angular or polygonal ring in the internal space. In this embodiment, the pin bearer preferably has a base arm at the respective end of which an L-shaped (as seen in the longitudinal section of the joint) appendage follows. One pin, respectively, is arranged on the L-shaped appendages, which reaches through the respectively associated bearing element in the associated joint yoke. Of course, the fastening elements and the pin bearers may also be formed as appropriate embodiments that are different from the respectively preferred ones.

Therefore it is expediently provided that the elastic coupling element is connected both with the base web of the respective fastening element as well as with the base web of the pin bearer.

In a further preferred embodiment of the invention, the fastening element, with its L-shaped area, is arranged at an outer side of the joint yokes that is opposite to the internal space. In this advantageous embodiment it is expedient if the elastic coupling element is formed as a torsion-resistant, flexural elastic or axially elastic ring, or annulus, or multi-angular or polygonal ring that is guided around the outer sides of the joint yokes. In this embodiment, the pin bearer has a base arm pivoted at both sides in a yoke with an appendage arranged, respectively, at the end, which appendage has at least one area which can preferably be formed substantially identically with the L-shaped area of the fastening element. Of course, the area in this case is arranged at an outer side of the associated joint yoke. In this case, the elastic coupling element is, on the one hand, connected with the L-shaped area of the fastening element, and on the other hand, with the area of the appendage formed substantially identically thereto.

The elastic coupling element may, for example, consist of rubber or the like. Therefore, a screw joint, rivet joint, vulcanization or the like can, for example, be provided as the connection of the elastic coupling element with the fastening element or the pin bearer.

For receiving the bearing, the two joint yokes may either be formed differently and weight-optimized, or identically and cost-optimized.

The cardan joint according to the invention is particularly suitable for use in a steering column of a motor vehicle, wherein axial shocks can be filtered out as compared to a conventional cardan joint. This behavior is especially desirable in structures of steering columns because thus, axial shocks, for example due to stimuli from the road, can be kept away from a steering wheel without having to make sacrifices with regard to torsional stiffness. By integration of the elasticity through the doubly pivotally supported elastic coupling element into the cardan joint, it is avoided that a bending stiffness must also be provided, in addition to the axial compliance. By means of the cardan joint according to the invention, the axial compliance can be made greater so that insulation properties are also improved over conventional elastic couplings in structures of steering columns. The integrated elastic coupling element does not have to convey significant bending moments because the elastic coupling element is kept free of bending by bearings in the axis of the moments. This makes ideal compliance properties in axial direction without bending resistances with optimal stiffness in the direction of rotation possible. The large axial compliance of the joint can favor omitting the otherwise commonly used slip joint from the steering column, which has to compensate fitting tolerances and stimuli from the road. In addition, the cardan joint according to the invention, if formed with a disk, can be produced with comparably large yoke widths and, advantageously, with correspondingly small-sized yoke bearings in an appropriate size, with much larger torques being transmittable than in a cardan joint with small yoke widths and larger (more expensive) yoke bearings. In addition, the integration of the ring according to the invention permits a simple conveying of the flexible ring in axial direction.

A great axial clearance, which is only adjusted by the compliance characteristics of the flexible element, is the result of the cantilevered support of the fastening elements. The cardan joint according to the invention also requires a minimum of axial constructional space because the pin bearer can be formed in the internal space straight between the two bearing positions of the yokes.

The invention can further include one or more features being subject matter of the dependant claims. Modes for carrying out the present invention are explained below by reference to non limiting embodiments of the present invention shown in the attached drawings. The above-mentioned object, other objects, characteristics and advantages of the present invention will become apparent from the detailed description of the embodiment of the invention presented below in conjunction with the attached drawings.

BRIEF DESCRIPTION OF THE DRAWINGS

Further advantageous embodiments of the invention are disclosed in the dependent claims and the following description of the figures. In the figures:

FIG. 1 shows a side view of a cardan joint,

FIG. 2 shows a representation along a section A from FIG. 1,

FIG. 3 an exemplary pin bearer seen in longitudinal section,

FIG. 4 shows a side view of a cardan joint in a second embodiment,

FIG. 5 shows a representation along the section A from FIG. 4, and

FIG. 6 shows a further exemplary pin bearer seen in longitudinal section.

In the different figures, the same parts are always provided with the same reference numeral so that they are also only described once, as a rule.

DETAILED DESCRIPTION OF THE INVENTION

The FIGS. 1 and 2 show a cardan joint 1 having two joint yokes 2. One of the joint yokes 2 is connected to a driven shaft 3 or drive shaft 3, the other joint yoke 2 being connected to the shaft 4 to be driven or driven shaft 4. The two joint yokes 2 are arranged twisted radially at an angle of 90° in relation to each other so that the two joint yokes 2 form an internal space 6. An elastic coupling element 7 is associated with the cardan joint 1. At their respectively axially opposite yoke arms 8, the joint yokes 2 are associated with bearing elements 9, 11. One fastening element 13, respectively, is pivoted in one of the joint yokes 2 or its axially opposite yoke arms 8, a pin bearer 14 being pivoted in the other joint yoke 2 or its yoke arms 8. The fastening elements 13 and the pin bearer 14 are connected with each other via the elastic coupling element 7.

For the cantilevered support of the fastening elements 13, the bearing elements 9 associated with the fastening elements 13 are preferably formed such that they can accept a bending moment. Therefore, the bearing elements 9 are preferably formed as double-row anti-friction bearings, for example, as double-row ball bearing. However, the bearing elements 9 may also be formed as broad plain bearings, the bearing elements 11 associated with the pin bearer 14 being formed as single-row bearings. The bearing elements 11 may, for example, be designed as anti-friction bearing, e.g., as needle or ball bearing; the bearing elements 11 may of course also be designed as plain bearings.

The bearing elements 9 and 11 are fixed in a suitable manner, radially relative to the axis of the joint, in the joint yokes 2 or their yoke arms 8. Possible embodiments are, for example, press fit, bonding or positive fit (abutting at the shoulder, spring ring or the like) of the outer races of the bearing in the joint yokes 2 or their joint arms 8.

According to the number of yoke arms 8, two fastening elements 13 are associated with the cardan joint 1 which fastening elements are identical to each other, which is why only one will be described hereinafter.

The fastening elements 13 is formed as a pivot bolt or anchor pin, and has, seen in longitudinal section of the joint, an L-shaped area 17 with a transversal web 18 and a base web 19 which, in the FIGS. 1 and 2, points radially inwards and is arranged perpendicularly to the transversal web 18. The L-shaped area 17 merges into a pin 21, which, in the exemplary embodiment shown in FIGS. 1 and 2, with its free end 22, which is opposite to the L-shaped area 17, protrudes slightly in radial direction over an outer side 23 of the joint yokes 2, in particular of the yoke arms 8 or the bearing elements 9, which outer side is opposite to the internal space 6.

A securing element 24, preferably a shaft securing ring, is associated with the free end 22, which is supported in a corresponding groove. The groove is incorporated at a suitable place in the free end 22.

The pin 21 is formed corresponding to the width of the bearing elements 9 in the respective joint yokes 2 so that the fastening element 13 is pivoted in the respective joint yokes 2 or their yoke arms 8.

In the exemplary embodiment shown in FIGS. 1 and 2, the fastening elements 13 with their L-shaped areas 17 are cantilevered in the internal space 6, and with their transversal web 18 are respectively arranged at an inner side 26 of the yoke arms 8 that is opposite to the outer side 23. The transversal web 18 respectively abuts a side of the bearing elements 9 oriented towards the inner side 26. The L-shaped areas 17 or the fastening elements 13 are spatially separated from each other. The elastic coupling element 7 is provided for the connection of the fastening elements 13.

The pin bearer 14, in a preferred embodiment, is shown in FIG. 3 in an exemplary manner, FIG. 3 only showing a partial view up to an axis of symmetry X.

The pin bearer 14 has a base arm 29 which is followed by an L-shaped appendage 28 with a base web 27 and a contact arm 31, so that the pin bearer 14 is formed U-shaped, as it were.

The contact arm 31 is arranged on the inner side 26 of the associated joint yoke 2, one pin 33 of the pin bearer 14 reaching through the bearing elements 11 of the associated joint yoke 2. The pin bearer 14, with the contact arm 31, abuts a side of the bearing element 11 oriented towards the inner side 26.

The pin 33 protrudes slightly over the outer side 23 of the joint yoke 2 but may also end flush with the outer side 23. A securing element 24 can be associated with the pin, as well as with the fastening element 13.

The elastic coupling element 7, in the exemplary embodiment shown in the FIGS. 1 and 2, is formed as a disk, preferably as a torsion-resistant, flexural elastic or axially elastic disk, preferably as a round, multi-angular or polygonal Hardy disk, and is connected with the base webs 19 of the fastening elements 13 as well as with the base web 27 of the pin bearer 14 in the internal space 6. However, it is also conceivable that the elastic coupling element 7 in the exemplary embodiment according to the FIGS. 1 and 2 may be formed as a torsion-resistant, flexural elastic or axially elastic ring of round, multi-angular or polygonal design. The elastic coupling elements 7 consists, for example, of a rubber, and may also contain reinforcing loops or reinforcing fabric of stronger metallic or non-metallic material. A screw joint, rivet joint, vulcanization or the like may for example be provided as connection with the respective fastening element 13 and the pin bearer 14. In the FIGS. 1 and 2, the connection is in principle represented by a chain-dotted line 51.

By way of example, in the cardan joint 1, an input moment (direction of rotation 36) is transmitted via the driven shaft 3 (drive shaft) via the joint yoke 2 onto the pair of fastening elements 13 pivoted therein or onto the fastening elements 13 respectively supported in the opposite joint arms 8, and thence, as tensile/compression stress, onto the elastic coupling elements 7 to the pin bearer 14 and then on to the joint yoke 2 of the shaft 4 to be driven or drive shaft. This is represented by means of the output moment (direction of rotation 37) that is equidirectional with the input moment (direction of rotation 36). With regard to the bending stiffness required to a small degree, the elastic coupling element 7 is selected such that it is ensured that a rotation of the pins 21 and 33 can take place during an inclination (inclination 52) and rotation of the joint yoke 2 in order to overcome the friction torque according to the selected bearing clearance in the bearings 9 and 11. In axial direction, the elastic coupling element 7 thus permits a compliance that can be used for insulation, while the contour of the elastic coupling element 7 provides a high torsional stiffness. In the exemplary embodiment shown, the drive shaft 3 is represented on the right side in the plane of the drawing. Of course, the drive shaft 3 may also be disposed on the left side in the plane of the drawing. Naturally, the directions of rotation 36 or 37 may also be opposite to the direction of rotation shown.

A further exemplary embodiment of the cardan joint 1 according to the invention is shown in the FIGS. 4 and 5. In contrast to the exemplary embodiment shown in FIGS. 1 and 2, the fastening elements 13 with their L-shaped area are arranged at the outer side 23 of the joint yokes 2 or their yoke arms 8, so that the pin 21 protrudes with its free end 22 slightly into the internal space 6, which cannot be seen in FIG. 4. Here, the base web 19 is oriented radially outwardly. The base web 18 is arranged at the outer side 23 of the joint yokes 2 or the yoke arms 8 and abuts the side of the bearing elements 9 that is oriented towards the outer side 23. In contrast, therefore, a pin bearer 38 is formed differently to the one described in FIG. 3.

The pin bearer 38, in a preferred embodiment, is shown in FIG. 6 in an exemplary manner, FIG. 6 only showing a partial view up to an axis of symmetry X. The pin bearer 38 (FIG. 6) has a base arm 39 which is followed by a bearing area 43 which reaches through the bearing element 11 arranged in the associated joint yoke arm 8. In relation to the base arm 39, the bearing area 43, in cross section, is formed thinner so that the pin bearer 38 with its bearing area 43 abuts the bearing elements 11 radially. The bearing area 43 preferably ends flush with the outer side 23 of the associated joint yoke 2 but may also protrude slightly or end slightly short, wherein it must be ensured that the bearing 11 is fixed axially in the bearing axis (radially in relation to the joint axis) on the pin bearer, for example, by positive fit (one-sided or two-sided shoulder fit, as shown in FIG. 4 and or by press fit, bonding or similar fixing. A fastening area 44, which in cross section is formed essentially L-shaped with a transversal web 46 and a base web 47 that is directed radially outward and perpendicular to the transversal web 46, follows the bearing area 43. The fastening area 44 is preferably assembled from separate components, wherein the base arm 39 may preferably be produced in one piece with the bearing area 43. The fastening areas 44 can be joined to the second area 43 of the pin bearer in a suitable manner (e.g. by screwing, fitting, rivets or similar).

The elastic coupling element 7 is formed as a ring, for example as an annulus, as shown, or as a ring with a multi-angular or polygonal contour, preferably torsion-resistant, flexural elastic or axially elastic, and guided around the outer sides 23 of the joint yokes 2 or their yoke arms 8, the base web 19 being formed slightly longer in comparison with the FIGS. 1 and 2. Preferably, the base web 47 of the pin bearer 38 is formed identically with the base web 19. In the exemplary embodiment shown, the base web 19 and also the base web 47 have a form that is more or less adjusted to the ring so that the base webs 19 or 47 with their respective free ends 48 end flush with an outer side 49 of the elastic coupling element 7. Advantageously, the cardan joint 1 can be formed smaller if formed according to the FIGS. 4 and 5, with a coupling element 7 formed as a ring, than if formed according to the example pertaining to the FIGS. 1 and 2, while an axial flexibility can be increased at the same rotational stiffness. In other regards, the embodiment according to the FIGS. 4 and 5 corresponds to the embodiment according to FIGS. 1 and 2.

In contrast to the exemplary embodiment shown in FIGS. 1 and 2, the elastic coupling element 7, as ring or annulus, is not disposed in the internal space 6, but outside around the respective joint yokes 2. The elastic coupling element 7 is formed as a torsion-resistant, flexural elastic or axially elastic ring or annulus.

In the embodiment according to FIGS. 4 and 5, the elastic coupling element 7 is connected with the pin bearer 38 via the base web 47 of the third area 44. A screw joint, rivet joint, vulcanization or the like can preferably be provided as a connection.

The connection of the respective elastic coupling element 7 with the respective fastening elements 13 and pin bearers 14 or 38 is indicated by means of the chain-dotted axis 51 in the FIGS. 1 or 4.

The joint yokes 2 or their yoke arms 8 may either be formed in an identical manner or, as illustrated in the FIGS. 1, 2 and 4 as well as 5, differently, for receiving the bearing elements 9 and 11.

The cardan joint 1 shown in the FIGS. 1, 2 and 4 as well as 5 is particularly suitable for use in a steering column of a motor vehicle. The shafts 3 and 4 are shown oriented in alignment towards each other. In the vehicle, there usually is an angled position, relative to each other, with the cardan joint maintaining the transmission of the rotation. The angled position is shown in FIGS. 1 and 4 by means of the angle of inclination 52.

What is claimed is:

1. A universal joint for coupling a drive shaft and a driven shaft comprising:
   two joint yokes, each joint yoke having bearing elements at axially opposite yoke arms, the two joint yokes being arranged radially at an angle of 90° in relation to each other to form an internal space;
   fastening elements having an L-shaped cross section and pivotable in the axially opposite yoke arms of one of the joint yokes;
   a pin bearer pivotable in the other joint yoke; and
   an elastic coupling element,
   wherein the fastening elements and the pin bearer are connected to each other via the elastic coupling element.

2. The universal joint according to claim 1, further comprising four bearing elements, two of which are associated with the fastening elements,
   wherein the fastening elements associated with the bearing elements are formed such that they can accept a bending moment.

3. The universal joint according to claim 1, further comprising four bearing elements, two of which are associated with the fastening elements and two of which are associated with the pin bearer,
   wherein the bearing elements that are associated with the fastening elements are formed as double-row anti-friction bearings and the bearing elements that are associated with the pin bearer are formed as single-row anti-friction bearings.

4. A universal joint for coupling a drive shaft and a driven shaft comprising:
   two joint yokes arranged radially at an angle of 90° in relation to each other to form an internal space, each joint yoke having axially opposite yoke arms;
   fastening elements pivoted in the axially opposite yoke arms of one of the joint yokes;
   a pin bearer pivoted in the other joint yoke; and
   an elastic coupling element;
   wherein the fastening elements and the pin bearer are connected to each other via the elastic coupling element and the fastening elements are formed as pivot bolts and have, in cross section, an L-shaped area with a transversal web and a base web, the L-shaped area merging into a pin.

5. The universal joint according to claim 4, wherein the pin bearer has a base web corresponding to the base web of the fastening elements.

6. The universal joint according to claim 4, wherein the fastening elements are disposed in the internal space.

7. The universal joint according to claim 4, wherein the pin bearer is arranged in the internal space.

8. The universal joint according to claim 4, wherein the elastic coupling element is connected with respective base webs.

9. The universal joint according to claim 4, wherein the elastic coupling element is formed as a torsion-resistant, axially elastic disk that is disposed in the internal space.

* * * * *